United States Patent [19]

Eberle

[11] Patent Number: 4,609,365
[45] Date of Patent: Sep. 2, 1986

[54] DRIVE APPARATUS CONTAINING A UNIVERSAL LINK CHAIN

[75] Inventor: Jürg Eberle, Hinwil, Switzerland

[73] Assignee: Feramatic AG, Hinwil, Switzerland

[21] Appl. No.: 432,768

[22] Filed: Oct. 4, 1982

[30] Foreign Application Priority Data

Oct. 16, 1981 [CH] Switzerland ............... 6620/81

[51] Int. Cl.⁴ .................................... F16H 7/06
[52] U.S. Cl. ........................... 474/154; 474/155; 474/144; 474/147; 474/203; 474/211
[58] Field of Search ............ 474/153, 154, 155, 144, 474/146, 147, 165, 203, 211, 100

[56] References Cited

U.S. PATENT DOCUMENTS

| | | | |
|---|---|---|---|
| 534,442 | 2/1895 | Linn | 474/154 |
| 576,105 | 2/1897 | Flindall | 74/216.3 |
| 578,556 | 3/1897 | Flindall | 74/216.3 |
| 2,526,173 | 10/1950 | Thomassin | 474/140 |
| 2,551,821 | 5/1951 | Bengtson | 474/154 |
| 3,718,051 | 2/1973 | Eck | 74/216.3 |
| 4,397,145 | 8/1983 | Reist | 59/78 |

FOREIGN PATENT DOCUMENTS

| | | |
|---|---|---|
| 839148 | 5/1952 | Fed. Rep. of Germany . |
| 2205767 | 8/1973 | Fed. Rep. of Germany ...... 474/153 |
| 2357444 | 2/1978 | France . |

Primary Examiner—Stephen J. Novosad
Assistant Examiner—Michael A. Goodwin
Attorney, Agent, or Firm—Werner W. Kleeman

[57] ABSTRACT

A universal or ball pivot-link chain is guided in two substantially tubular-shaped guide channels and is deflected or turned between such guide channels by means of a driven chain or sprocket wheel. At its circumference the chain wheel possesses a profiled structure formed by recesses or depressions which substantially correspond to the profile or outer contour of the universal link chain. The guide channels extend to the circumference of the chain wheel and form in conjunction therewith a respective transfer or transition region. At each such transfer region the chain wheel protrudes by an amount, essentially corresponding to the depth of the recesses, into the interior of the related guide channel. At such transfer or transition regions the chain links are guided both by the chain wheel and the guide channels. Consequently, there is ensured for a gentle and jerk-free transfer of the chain links from the chain or sprocket wheel to the guide channels and vice versa.

20 Claims, 4 Drawing Figures

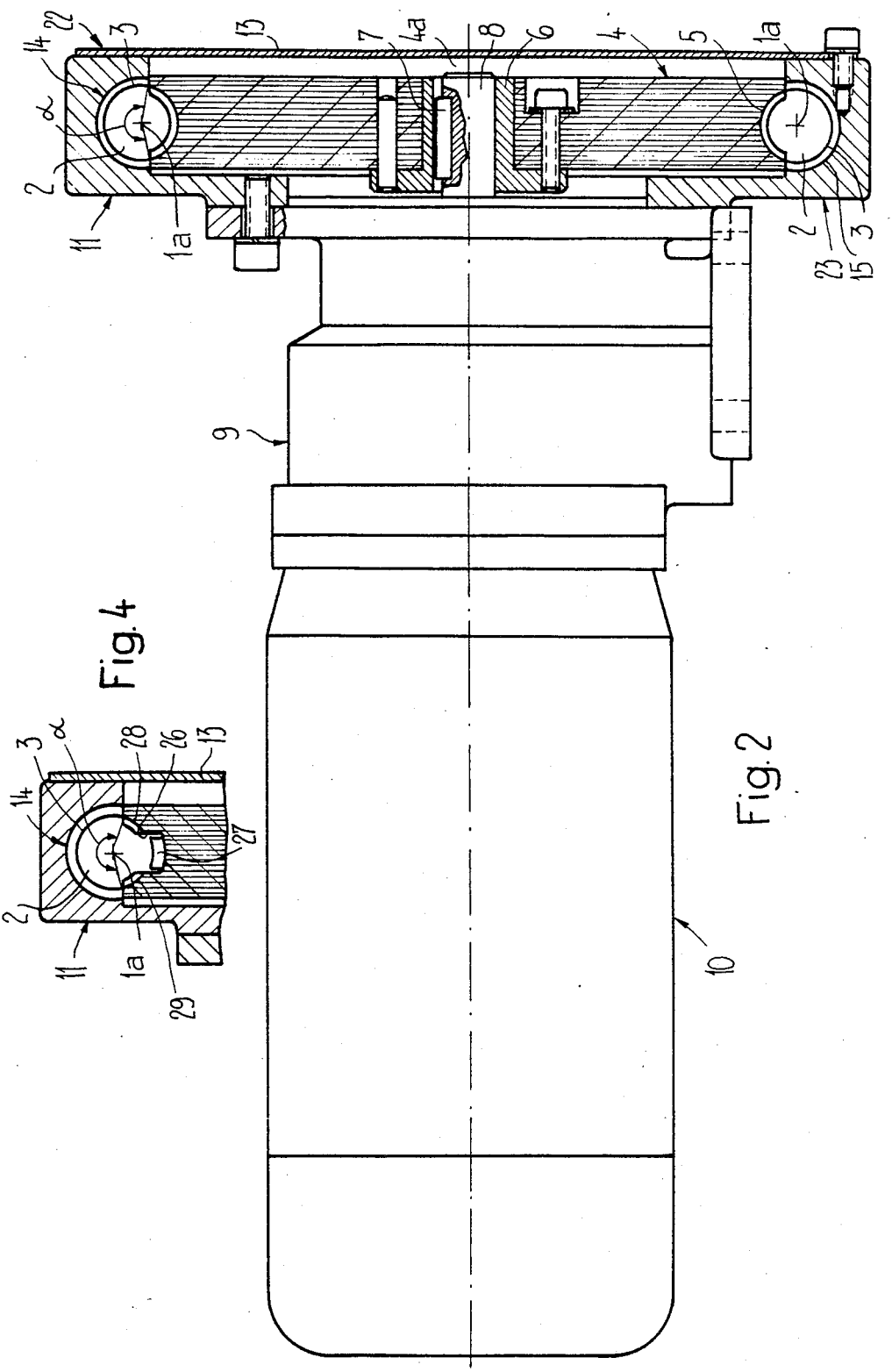

DRIVE APPARATUS CONTAINING A UNIVERSAL LINK CHAIN

BACKGROUND OF THE INVENTION

The present invention relates to a new and improved construction of a drive apparatus containing a universal or ball pivot-link chain.

Generally speaking, the drive apparatus of the invention contains at least one chain or sprocket wheel which engages at the chain links by means of its circumferential profile or outer contour which is constructed to be complementary to the profile or outer contour of the chain. Additionally, there is provided at least one guide channel merging with the chain or sprocket wheel and within which there are guided the chain links at their circumference.

In a drive apparatus of this type which is known from U.S. Pat. No. 4,151,754, granted May 1, 1979, the guide channels terminate in spaced relationship from the chain or sprocket wheel. Consequently, the chain links are only inadequately guided at the transfer or transition region between the guide channels and the chain or sprocket wheel. In particular, the danger of bowing-out or kinking of the chain therefore exists at the run of the ball pivot-link chain which outbounds from the chain or sprocket wheel, and specifically, particularly then when such chain run must transmit thrust forces, and thus, is exposed to compressive loads.

SUMMARY OF THE INVENTION

Therefore, with the foregoing in mind it is a primary object of the present invention to provide a new and improved construction of a drive apparatus containing a universal or ball pivot-link chain which is not afflicted with the aforementioned drawbacks and limitations of the prior art.

Another and more specific object of the present invention aims at the provision of a new and improved construction of drive apparatus of the previously mentioned type which is of simple construction and design and renders possible a faultless and extensively wear-free transfer of the link chain from the chain or sprocket wheel into the related guide channel and vice versa.

Still a further significant object of the present invention is concerned with an improved drive apparatus containing a universal or ball pivot-link chain, which drive apparatus is relatively simple in construction and design, quite economical to manufacture, extremely reliable in operation, not readily subject to breakdown or malfunction, and requires a minimum of maintenance and servicing.

Now in order to implement these and still further objects of the invention, which will become more readily apparent as the description proceeds, the inventive drive apparatus which contains a ball pivot-link chain or universal link chain is of the type wherein the guide channel extends essentially in tangential direction with respect to the circumference of the chain or sprocket wheel. This guide channel possesses at its channel wall at least one recess by means of which the chain or sprocket wheel engages into the interior or internal space of the guide channel, in order to form in conjunction with such guide channel a transfer or transition location for the chain, and at which transfer location each chain link is simultaneously guided by the guide channel and the chain or sprocket wheel.

The chain links are guided both by the chain or sprocket wheel and also the guide channel at those locations where, as the case may be, the chain outbounds or inbounds at the chain or sprocket wheel, the guide channel extending up to such transfer or transition location. Consequently, there is ensured for a relatively wear-free, gentle and surge- or jerk-free transfer of the chain from the chain or sprocket wheel to the guide channel and vice versa.

According to a preferred construction of the drive apparatus of the present invention the chain links or elements are guided by the guide channel at the transfer location both along that half of their circumference which is situated opposite to the chain or sprocket wheel with respect to the central axis of the chain and also along at least one portion or section of its other circumferential half at which there engages the sprocket or chain wheel.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 2 is a cross-sectional view of the arrangement of FIG. 1, taken substantially along the line II—II thereof;

FIG. 4 is a fragmentary view, corresponding to the illustration of FIG. 2, however depicting a portion of the chain drive shown in FIG. 3 in sectional view, the section being taken substantially along the line IV—IV of FIG. 3.

DETAILED DESCRIPTION OF THE PREFERRED EMBODIMENTS

Figures 1, 3:
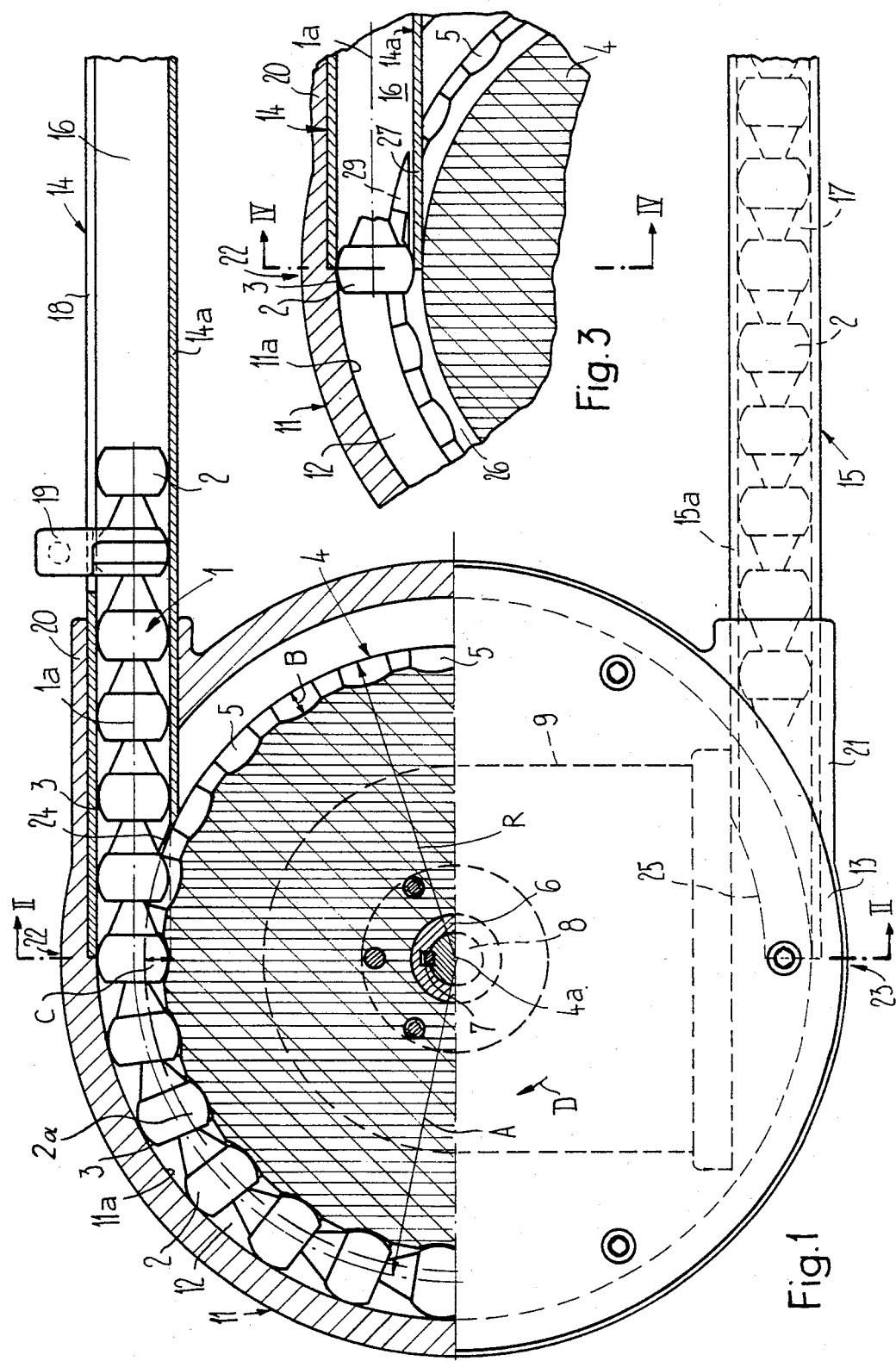
FIG. 1 illustrates a first exemplary embodiment of drive apparatus according to the invention, and specifically depicts in side view a portion of a chain drive, wherein the upper half of such chain drive has been shown in sectional view.
FIG. 3 is a detail sectional view, corresponding to the showing of FIG. 1, depicting a variant construction of the chain drive or drive apparatus of the invention.

Describing now the drawings, it is to be understood that only enough of the construction of the drive apparatus of the present development has been shown therein as needed for those skilled in the art to readily understand the underlying principles and teachings of the present development, while simplifying the illustration of the drawings. Turning attention now to FIGS. 1 and 2, there has been shown in fragmentary sectional view a first exemplary embodiment of drive apparatus or chain drive which will be seen to comprise a universal link chain or ball pivot-link chain 1 of known design and which may be of the type disclosed, for instance, in German Patent Publication No. 3,121,835 and the cognate commonly assigned, copending U.S. application Ser. No. 06/268,729, filed June 1, 1981, now U.S. Pat. No. 4,397,145, granted Aug. 9, 1983. This universal or ball pivot-link chain 1 consists of a number of individual chain links or elements 2 which are connected with one another by means of ball pivot or swivel bodies, merely generally indicated by reference character 2a. Each chain link or element 2 possesses a substantially spherical guide surface 3 which extends in the circumferential direction of the related chain link or element 2. The chain 1 travels over a chain or sprocket wheel 4 or equivalent structure—herein usually broadly referred to as a chain wheel—which is formed of a suitable plastics material in the exemplary embodiment under discussion. This chain wheel 4 possesses at its circumference a profile or outer contour which appropriately corresponds or is complementary to the profile of the universal link chain 1. This circumferential profile of the chain wheel 4 is formed by recesses or depressions 5 or equivalent structure in which there come to lie the chain links 2 by means of their guide surfaces 3. Bolted or otherwise suitably secured to the chain wheel 4 is a hub member 6 which is rigidly connected for rotation, by means of a suitable resilient or spring key 7 or equivalent structure, with a power take-off shaft 8 of a gearing or transmission device 9. This spring key 7 allows for a displacement of the chain wheel 4 in the direction of its axis of rotation 4a. As best seen by referring to FIG. 2, gearing device 9 is driven by a suitable drive motor 10. Centering of the chain wheel 4 upon the shaft 8 is accomplished by means of the universal or ball pivot-link chain 1 which travels over the chain wheel 4.

The chain wheel 4 is arranged in a bearing or support housing 11 which extends in spaced relationship from the chain wheel 4 in the circumferential direction of such chain wheel 4 and forms together therewith an intermediate space or compartment 12. The bearing or support housing 11 is closed by means of a suitable closure plate 13 at the side thereof facing away from the gearing device 9, as best seen by referring to FIG. 2.

Merging with the chain wheel 4 are two substantially tubular-shaped guide channels 14 and 15. In the respective internal space or region 16 and 17 of the mutually parallel guide channels 14 and 15, respectively, there travels the ball pivot-link chain 1 which is guided in the related guide channel 14 and 15 by virtue of the contact of the guide surfaces 3 of the chain links or elements 2 at the related wall 14a and 15a of the guide channels 14 and 15, respectively. The guide channel 14 possesses a longitudinal slot 18 which extends in its lengthwise direction. Extending through the longitudinal slot or opening 18 is a suitable entrainment element 19 which is attached to one chain link or element 2 and which can be coupled with a load which is to be moved. It should be understood that another such entrainment element also may be provided at the chain run guided in the other guide channel 15.

Both of the guide channels 14 and 15 extend, while protruding through projections or extensions 20 and 21, respectively, of the bearing housing 11, in tangential direction up to the circumference of the chain wheel 4 and form in conjunction therewith a respective transfer or transition location 22 and 23, at which the chain links or elements 2 transfer or shift from the chain wheel 4 to the related guide channel 14 and 15 and vice versa. At each such transfer or transition location 22 and 23 the chain wheel 4 extends into the interior or internal space 16 and 17 of the guide channels 14 and 15, respectively, and specifically by an amount C which essentially corresponds to the depth B of the recesses or depressions 5 of the chain wheel 4, as best seen by referring to FIG. 1. To render possible an engagement or entry of the chain wheel 4 into the internal spaces 16 and 17 of the guide channels 14 and 15, the guide channel walls 14a and 15a are provided with recesses 24 and 25 at the region of the transfer or transition locations 22 and 23, respectively. These recesses 24 and 25 are constructed in such a manner that the guide channels 14 and 15 merge with the chain wheel 4 with the smallest amount of play.

As best seen by referring to FIG. 1, the radius R of the chain wheel 4 is smaller than the spacing A between the rotational axis 4a of the chain wheel 4 and the central or lengthwise axis 1a of the universal or ball pivot-link chain 1, which practically coincides with the lengthwise axis of the guide channels 14 and 15. This chain wheel 4 therefore engages about the chain links or elements 2 located in the recesses or depressions 5 only along a region thereof which is smaller than one-half of the circumference of the chain links, as particularly well recognized from the illustration of FIG. 2. At the region of the transfer locations 22 and 23 it is therefore possible for the guide channels 14 and 15 to enclose the chain links 2 along a circumferential region which is correspondingly greater than one-half of the chain link circumference. This is readily apparent from the illustration of FIG. 2 in which there has been depicted the sector angle $\alpha$ corresponding to the circumferential region of the chain links 2 enclosed by the chain channels or channel members 14 and 15. This sector angle $\alpha$ is greater than 180°. At the transfer or transition regions 22 and 23 the chain links 2 are thus guided both by the chain wheel 4 and also by the related guide channel 14 and 15, respectively, so that during the run-off or detachment of the chain links 2 from the chain wheel 4 and the entry thereof into the related chain channel 14 or 15, as the case may be, there prevails a chain transfer operation which is essentially free of any jerks or surge-like movements and is extensively wear-free. The same equally holds true during the transfer of the chain links 2 from the related guide channel 14 or 15 to the chain wheel 4.

If, as has been illustrated in FIG. 1, the chain wheel 4 is rotated in the direction of the arrow D then the universal or ball pivot-link chain 1 travels from the guide channel 15 onto the chain wheel 4 and is moved by the action of this chain wheel 4 through a portion of the intermediate space or compartment 12 located between the transfer or locations 23 and 22. At this intermediate space or compartment 12 the chain links 2 are guided, on the one hand, by the chain wheel 4 and, on the other hand, by the inner wall 11a of the bearing or support housing 11. At the transfer location 22 the chain links 2 detach or emerge from the chain wheel 4 and are then received in the already described manner by the guide channel 14 through which these chain links 2 are subsequently pushed.

By virtue of the fact that the chain links 2 are engaged by the chain wheel 4 along a circumferential region which is smaller than one-half of the chain link circumference, there is exerted a tilting moment upon the chain links 2, which contributes to a faultless guiding of the chain links 2 in the intermediate space or compartment 12. Therefore, it is not necessary that there prevail an extremely exact form-locking or positive connection between the chain links 2 engaging with the recesses or depressions 5 of the chain wheel 4 and the chain wheel 4 itself. Quite to the contrary, it is possible to allow the chain links or elements 2 to engage with a certain amount of play into the recesses or depressions 5, which allows for a certain compensation between the chain links 2.

The exemplary embodiment of drive apparatus depicted in FIGS. 3 and 4 differs from the previously described construction of drive apparatus shown in FIGS. 1 and 2, essentially only by virtue of the different type of design of the end of the guide channels 14 and 15 at the region of the transfer or transition locations 22 and 23, respectively. It is for this reason that in FIGS. 3 and 4 there has been only illustrated the region of the transfer location 22 in a representation which is similar to the illustrations of FIGS. 1 and 2.

As will be seen from FIGS. 3 and 4, the guide or chain channel 14 possesses at its channel half which confronts the chain wheel 4 with respect to the chain central or lengthwise axis 1a a substantially tongue-shaped portion or section 27 which extends up to the transfer or transition region 22. At both sides of this tongue or tongue-shaped portion 27 there are provided at the wall 14a of the guide channel 14 recesses or openings 28 and 29 or equivalent structure, by means of which the chain wheel 4 engages with the internal space 16 of the guide or chain channel 14. The chain wheel 4 is provided at its circumference with a groove or recess 26 at which comes to bear the tongue 27 of the chain channel 14. The other chain channel 15 is correspondingly constructed at the other transfer or transition location 23.

As will be particularly evident from the illustration of FIG. 4, with this solution the chain links or elements 2 are guided at two portions or regions of their circumference by the guide or chain channel 14. This makes it possible to design the radius R of the chain wheel 4 so as to be the same size as the spacing A between the rotational axis 4a of the chain wheel 4 and the central or lengthwise axis 1a of the ball pivot-link chain 1. This means that the chain wheel 4, with the exception of the width of the groove 26, engages with the chain links 2 over one-half of the circumference of such chain links 2. In this case the sector angle $\alpha$, in contrast to the embodiment depicted in FIGS. 1 and 2, amounts to 180°. However, it is also possible, with this embodiment, to maintain the sector angle $\alpha$ smaller than 180°.

Furthermore, it is also conceivable, and as a modification of the embodiment of drive apparatus depicted in FIGS. 1 and 2, to guide the chain links or elements 2 throughout the entirety of one-half of their circumference by means of the chain wheel 4 and at the transfer regions 22 and 23 along their other circumferential half by means of the guide channels 14 and 15, respectively. However, such solution is somewhat poorer than the previously described exemplary embodiments as concerns the faultless transfer of the chain 1 between the guide or chain channels and chain wheel and vice versa. Additionally, in contrast to the herein illustrated exemplary embodiments there exists a certain danger of bowing-out or kinking of the chain 1.

It is to be understood that it is not absolutely necessary that the chain wheel 4 be driven and that there can be provided additional sprocket or chain wheels or equivalent structure. Also, it is possible to position the guide channels 14 and 15 with respect to the chain wheel 4, not as illustrated so as to extend essentially parallel to one another up to the region of the chain wheel, but so as to form an angle with one another. With this variant construction the transfer or transition locations 22 and 23 then no longer are positioned diametrically opposite one another.

Instead of driving a ball pivot-link chain 1 of the type illustrated by means of the described drive apparatus, it is also possible to drive other types of universal or ball pivot-link chains, for instance chains of the type disclosed in German Pat. No. 2,220,259 and the aforementioned U.S. Pat. No. 3,757,514.

While there are shown and described present preferred embodiments of the invention, it is to be distinctly understood that the invention is not limited thereto, but may be otherwise variously embodied and practiced within the scope of the following claims.

Accordingly, what I claim is:

1. A drive apparatus comprising:
   a universal link chain composed of interconnected chain links;
   at least one chain wheel for driving said universal link chain;
   said chain wheel having a circumferential profile engaging with the chain links of said universal link chain;
   said circumferential profile of said chain wheel being substantially complementary to the profile of said universal link chain;
   at least one guide channel having an internal space;
   said chain links being guided at their circumference in said guide channel;
   said guide channel extending in tangential direction up to the region of the circumference of said chain wheel;
   said guide channel having wall means provided with at least one recess through which the chain wheel enters the internal space of said guide channel, in order to form together with said guide channel a transfer location at which each chain link is simultaneously guided by the guide channel and the chain wheel; and
   said chain links being guided at the transfer location by means of the guide channel over a circumferential portion possessing a sector angle which is greater than 180°.

2. The apparatus as defined in claim 1, further including:
   an additional guide channel;
   both of said guide channels extending up to the circumference of the chain wheel;
   each of said guide channels forming in conjunction with said chain wheel a respective transfer location for the chain.

3. The apparatus as defined in claim 2, wherein:
   said transfer locations are located diametrically opposite one another.

4. The apparatus as defined in claim 2, wherein:
   said chain links possess guide surfaces which cooperate with said guide channel and engage at the chain wheel.

5. The apparatus as defined in claim 4, wherein:
   said guide surfaces possess a substantially spherical configuration.

6. The apparatus as defined in claim 2, wherein:
   said universal link chain extends into said internal spae of said at least one guide channel and into an internal space of said additional guide channel; and
   said chain wheel performing rotary reciprocal motion and entraining said universal link chain to perform translatory reciprocating motions within said at least one guide channel and said additional guide channel.

7. The apparatus as defined in claim 6, wherein:
   at least one of said at least one guide channel and said additional guide channel is provided with an elongate slot; and
   said universal link chain is provided with an entrainment tab extending through said elongate slot.

8. The apparatus as defined in claim 7, wherein:
   said universal link chain is subjected to compression when translating said entrainment tab away from said chain wheel and to tension when translating said entrainment tab toward said chain wheel as said chain wheel performs said rotary reciprocating motion.

9. The apparatus as defined in claim 1, wherein:
said chain links possess guide surfaces which cooperate with said guide channel and engage at the chain wheel.

10. The apparatus as defined in claim 9, wherein:
said guide surfaces possess a substantially spherical configuration.

11. The apparatus as defined in claim 1, wherein:
said chain wheel is provided at its circumference with recesses for receiving the chain links; and
said chain wheel protruding into said guide channel by an amount essentially corresponding to the depth of said recesses.

12. The apparatus as defined in claim 1, wherein:
said chain links are guided, at the transfer location, by said guide channel at least along that half of their circumference which, with respect to a lengthwise axis of the chain is located opposite the chain wheel, whereas the chain wheel engages with the chain links over at least a portion of the other circumferential half of said chain links.

13. The apparatus as defined in claim 12, wherein:
the chain links are guided at the transfer location by means of the guide channel along at least a portion of that circumferential half thereof at which engages the chain wheel.

14. The apparatus as defined in claim 13, wherein:
the radius of the chain wheel is smaller than the spacing between an axis of rotation of the chain wheel and the lengthwise axis of the chain.

15. The apparatus as defined in claim 1, further including:
guide means for guiding the chain links engaged by the chain wheel; and
said guide means merging at the transfer location with the guide channel and extending in spaced relationship along at least a portion of the circumference of the chain wheel.

16. The apparatus as defined in claim 1, further including:
shaft means for the chain wheel; and
means for mounting said chain wheel so as to be axially displaceable upon said shaft means.

17. A drive apparatus, comprising:
a universal link chain composed of interconnected chain links;
at least one chain wheel for driving said universal link chain;
said chain wheel having a circumferential profile engaging with the chain links of said universal link chain;
said circumferential profile of said chain wheel being substantially complementary to the profile of said universal link chain;
at least one guide channel having an internal space;
said chain links being guided at their circumference in said guide channel;
said guide channel extending in tangential direction up to the region of the circumference of said chain wheel;
said guide channel having wall means provided with at least one recess through which the chain wheel enters the internal space of said guide channel, in order to form together with said guide channel a transfer location at which each chain link is simultaneously guided by the guide channel and the chain wheel;
said chain links being guided, at the transfer location, by said guide channel at least along that half of their circumference which, with respect to a lengthwise axis of the chain, is located opposite the chain wheel, whereas the chain wheel engages with the chain links over at least a portion of the other circumferential half of said chain links;
the chain links being guided at the transfer location by means of the guide channel along at least a portion of that circumferential half thereof with which engages the chain wheel;
said guide channel possessinng a substantially tongue-like portion at its half confronting the chain wheel with respect to the lengthwise axis of the chain;
said tongue-like portion extending up to the transfer location; and
respective recesses in the channel wall means adjacent each one of both sides of said tongue-like portion and through which the chain wheel enters into the interior of the guide channel.

18. The apparatus as defined in claim 17, wherein:
said chain wheel possesses a groove at its circumference; and
said tongue-like portion of said guide channel extending into said groove.

19. A drive apparatus comprising:
a universal link chain composed of interconnected chain links;
at least one chain wheel for driving said universal link chain;
said chain wheel having a circumferential profile engaging with the chain links of said universal link chain;
said circumferential profile of said chain wheel being substantially complementary to the profile of said universal link chain;
at least one guide channel having an internal space;
said chain links being guided at their circumference in said guide channel;
said guide channel extending in tangential direction up to the region of the circumference of said chain wheel;
said guide channel having wall means provided with at least one recess through which the chain wheel enters the internal space of said guide channel, in order to form together with said guide channel a transfer location at which each chain link is simultaneously guided by the guide channel and the chain wheel;
said chain links being guided, at the transer location, by said guide channel at least along that half of their circumference which, with respect to a lengthwise axis of the chain is located opposite the chain wheel, whereas the chain, wheel engages with the chain links over at least a portion of the other circumferential half of said chain links;
the chain links being guided at the transfer location by means of the guide channel along at least a portion of that circumferential half thereof with which engages the chain wheel;
said chain links being guided at the transfer location by means of the guide channel over a circumferential portion possessing a sector angle which is greater than 180°;

the radius of the chain wheel being smaller than the spacing between an axis of rotation of the chain wheel and the lengthwise axis of the chain;

said guide channel possessing a substantially tongue-like portion at its half confronting the chain wheel with respect to the lengthwise axis of the chain;

said tongue-like portion extending up to the transfer location; and respective recesses in the channel wall means adjacent each one of both sides of said tongue-like portion and through which the chain wheel enters into the interior of the guide channel.

20. The apparatus as defined in claim 19, wherein:

said chain wheel possesses a groove at its circumference; and said tongue-like portion of said guide channel extending into said groove.

* * * * *